United States Patent [19]

Laughlin et al.

[11] Patent Number: 5,320,061
[45] Date of Patent: Jun. 14, 1994

[54] VEHICLE FLAG WITH REDUCED VIBRATIONS

[75] Inventors: Robert C. Laughlin, Gastonia, N.C.; Mason H. Chapman, Mauldin, S.C.

[73] Assignee: MAJO, Inc., Mauldin, S.C.

[21] Appl. No.: 38,849

[22] Filed: Mar. 29, 1993

[51] Int. Cl.⁵ .......................... G09F 17/00; B60Q 9/00
[52] U.S. Cl. ..................................... 116/28 R; 116/173
[58] Field of Search ...................... 116/28 R, 173, 264, 116/265; 40/212, 214, 215, 547, 591, 592, 593, 597, 602; 73/170.05, 170.06, 170.07

[56] References Cited

U.S. PATENT DOCUMENTS

| | | | |
|---|---|---|---|
| 1,401,626 | 12/1921 | Mader | 116/173 |
| 1,579,034 | 3/1926 | Roberts | |
| 1,743,694 | 1/1930 | Tierney | |
| 2,090,121 | 8/1937 | Hayes | 116/173 |
| 3,071,892 | 1/1963 | Clark | 40/215 |
| 3,762,360 | 10/1973 | Hawes | 116/28 R |
| 3,791,336 | 2/1974 | Zdebski | 116/28 R |
| 4,519,153 | 5/1985 | Moon | 40/591 |
| 4,558,862 | 12/1985 | Kelly | 273/34 |
| 4,561,301 | 12/1985 | Steele | 116/265 X |
| 4,627,278 | 12/1986 | Soto | 73/188 |
| 4,901,662 | 2/1990 | Sandeen et al. | 116/28 R |
| 4,976,410 | 12/1990 | Tomaiuolo | 248/514 |
| 4,986,209 | 1/1991 | Spica | 116/28 R |
| 5,084,994 | 2/1992 | Elmer | 40/591 |

FOREIGN PATENT DOCUMENTS 1108652  9/1953  France .................. 116/173

Primary Examiner—William A. Cuchlinski, Jr.
Assistant Examiner—W. Morris Worth
Attorney, Agent, or Firm—Cort Flint; Henry S. Jaudon

[57] ABSTRACT

A display device for use with vehicles comprising a wind sock and a mounting unit adapted to secure with the window of a vehicle to carry the wind sock above the top of the vehicle. The wind sock is tapered from front to rear. The mounting unit retains the forward end of the wind sock open and in a vertical position. The mounting unit securely fastens with the vehicle in a removable manner.

14 Claims, 3 Drawing Sheets

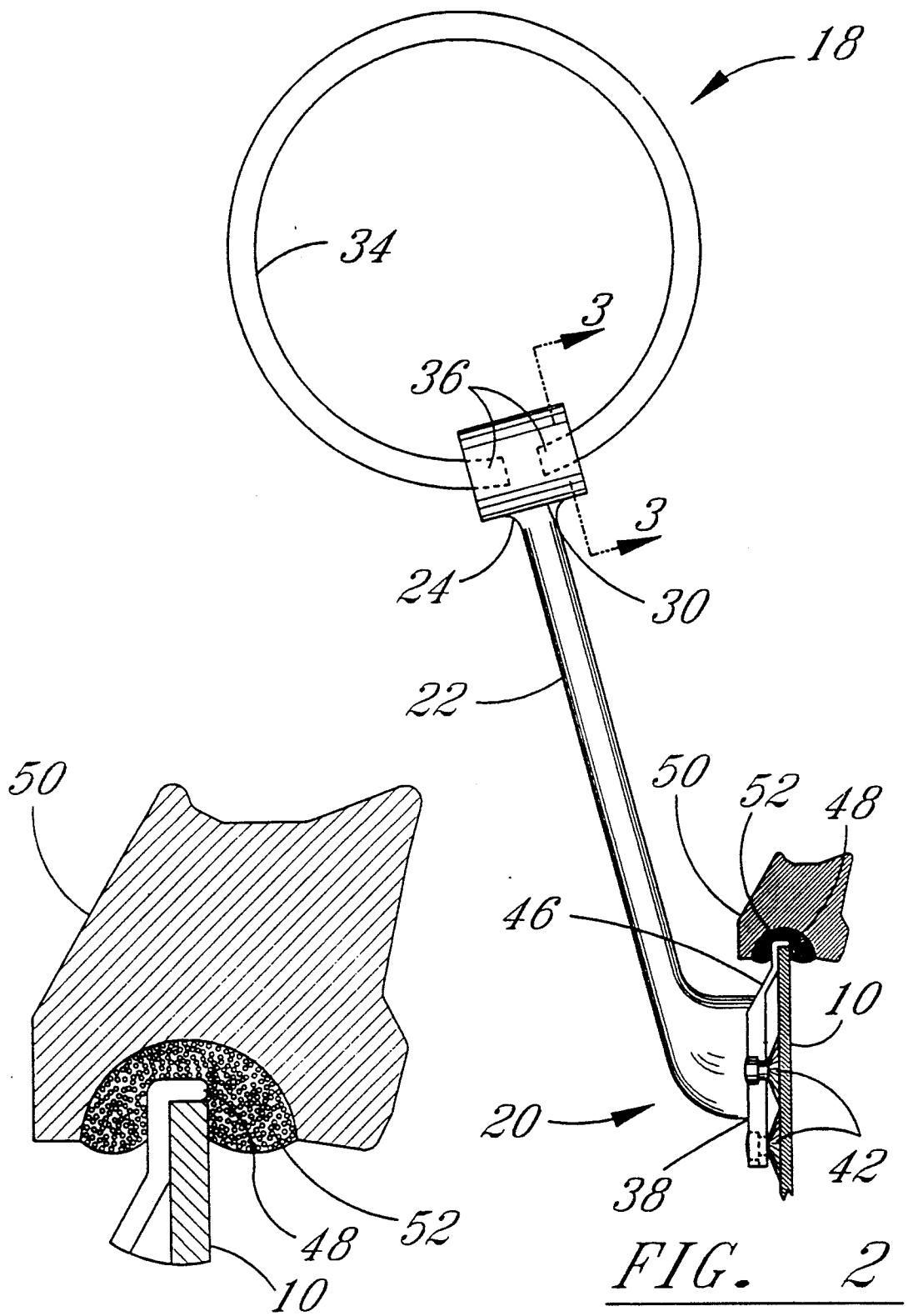

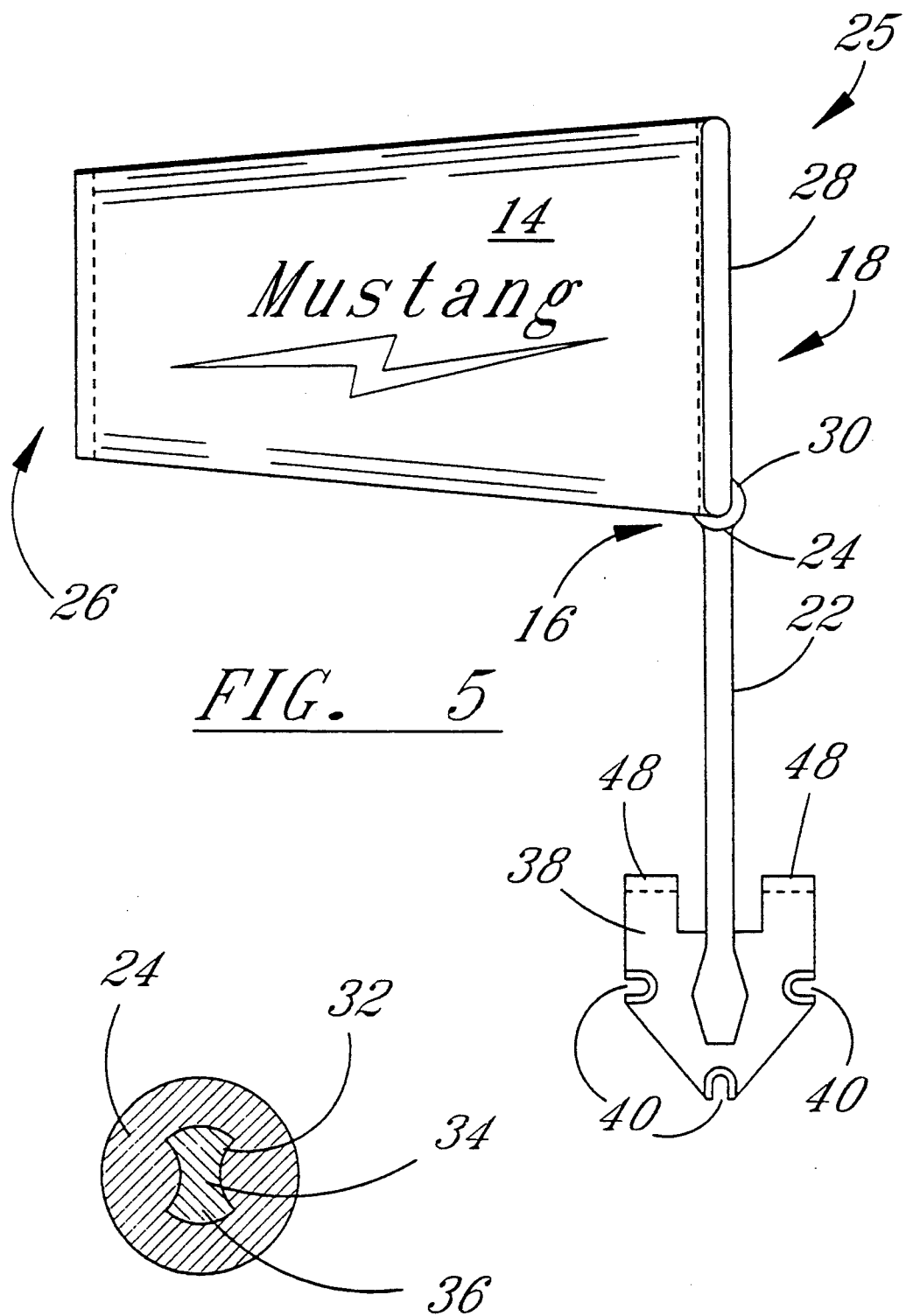

VEHICLE FLAG WITH REDUCED VIBRATIONS

BACKGROUND OF THE INVENTION

The instant invention is directed to a display device for vehicles, particularly automobiles, small trucks, and vans. Primarily, the display device is intended for use by sports fans to display team emblems or logos when attending sporting events.

In the past, the primary display arrangement for such events consisted of a flag having indicia printed thereon and attached to a window held stand. Such types of arrangements are shown in U.S. Pat. Nos. 3,762,360; 4,519,153; 4,976,410 and 4,986,209. While each of these patents are directed to specific areas of novelty, they each retain the two major draw backs to vehicle carried displays, i.e. vibration and noise.

When the vehicle is traveling upwards of sixty miles per hour on interstate highways, the flag portion of the display whips back and forth which such veracity as to create a vibration which can be felt inside the vehicle. This motion of the flag also creates a noise level which also is heard inside the vehicle. Both can be disturbing.

Wind socks are of themselves not a novel idea. They have been used for years at airports to indicate wind direction. Also, they have been used as golf flags and even as display flags for vehicles as is illustrated by U.S. Pat. Nos. 1,401,626 and 2,090,121. The focus in each of these patents is the mounting structure for the rod member carrying the wind sock with the vehicle. The mounting rod is simply bent at its upper end to receive the wind sock. Should the display structure of either of these patents be subject to high vehicle speeds, the rod loop would simply bend against the force.

The instant invention has as its object to overcome the drawbacks of the prior art arrangements by providing a vehicle carried display device capable of withstanding forces created by high speed driving.

Another object of the invention is to provide a vehicle carried display which produces substantially no noise while being carried at high speeds.

Another object of the invention is to provide a vehicle carried display device which produces substantially no vibration while being carried at high speeds.

Another object of the invention is to provide a vehicle carried display device which can be readily and securely fastened to vehicles.

Another object of the invention is to provide a securing assembly for a vehicle carried display device which will remain connected with the vehicle window when raised or lowered.

Another object of the invention is to provide a mounting assembly structure for a display device which is light weight and yet sturdy.

Another object of the invention is to provide a mounting assembly for an air sock display which will retain the forward end of the sock both open and extending vertically.

SUMMARY OF THE INVENTION

A display device adapted for use with a vehicle. The display device consists of a wind sock attached to a mounting assembly. The mounting assembly includes a support rod having an upper mounting unit for mounting the wind sock and a lower mounting unit for mounting with the vehicle. The upper mounting unit member includes a tubular member having a shaped inner surface. The upper mounting unit further includes a mounting ring comprising a broken circular member. The opposed ends of the broken ring have a shaped circumference configured to matingly fit within the shaped inner surface of the tubular mounting member. The shaped circumference and the shaped inner surface interact to lock the mounting ring in position with the mounting assembly so that a rigid support for the wind sock is provided when the display device is attached to a vehicle. The circumference of the mounting ring may be shaped along its entire length or only the areas adjacent the opposed ends may be shaped. The preferred shape for the circumference of the broken ring and the inner surface of the tubular member is dog-bone. Obviously, other shapes which lock the members in position are suitable.

The wind sock is tapered from front to rear and has at least one display affixed to its exterior.

The lower mounting unit includes a mounting plate composed of an upper and lower portion. The upper portion has a transverse ledge which extends over an upper edge of a vehicle window when the lower mounting member is mounted with a vehicle. The transverse ledge along with a part of the upper portion wedges between the window seal and the window when it is closed. The lower portion of the lower mounting member includes suction cups, preferably three, for securing with the window. The lower mounting member also includes a mounting plate which is arranged to extend substantially vertically when the lower mounting unit is secured with the vehicle. A lower end of the support rod is secured with the mounting plate and is arranged to extend transversely away therefrom for a short distance where it bends upwardly to extend substantially vertically away from the lower mounting member and the vehicle.

A display device which is adapted to be mounted with a vehicle and which comprises an elongate tubular wind sock having a forward and rearward opening. A forward portion adjacent the forward opening is provided with a ring receiving pocket formed therein. The wind sock has design indicia on its outer surface. The display device further includes a mounting assembly which consists of a support rod secured with a lower mounting unit adapted to secure with a vehicle window and an upper mounting unit for carrying the wind sock.

The lower mounting unit includes a mounting plate to which the lower end of the support rod is secured. The mounting plate includes suction means which attach with a vertical portion of the vehicle window and a transverse ledge which engages over an upper edge of the window. When the window is closed, the ledge is wedged between the window seal and its upper edge.

The support rod extends outwardly and upwardly from the lower mounting element to provide room for the overhang of the vehicle and to locate the upper mounting unit above the vehicle.

The upper mounting unit includes a mounting or support tube secured to the upper end of the support rod. The support tube is arranged to extend substantially transversely of the longitudinal axis of the support rod. There is a broken mounting ring adapted to secure within the mounting tube. The opposed ends of the broken ring mate with the mounting tube in a non-yielding fashion to form a circular upper mounting element which is received in the receiving pocket of the wind sock. The mounting tube comprises a tubular member having a shaped interior surface. The opposed ends of the broken mounting ring have a shaped exterior surface shaped to be fittingly received by the shaped interior surface of mounting tube. The surfaces interact to secure mounting tube with said broken ring in non-yielding fashion. The mounting assembly maintains the wind sock in position on the vehicle with its forward end maintained in a vertical open condition.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 2 is a sectional front view of the display device showing the engagement with a vehicle;

FIG. 3 is a sectional view of the broken ring taken along lines 3—3 of FIG. 2;

FIG. 4 is an exploded sectional view of the window engaging portion of the display device; and FIG. 5 is a side view of the display device.

DESCRIPTION OF A PREFERRED EMBODIMENT

Figure 1:
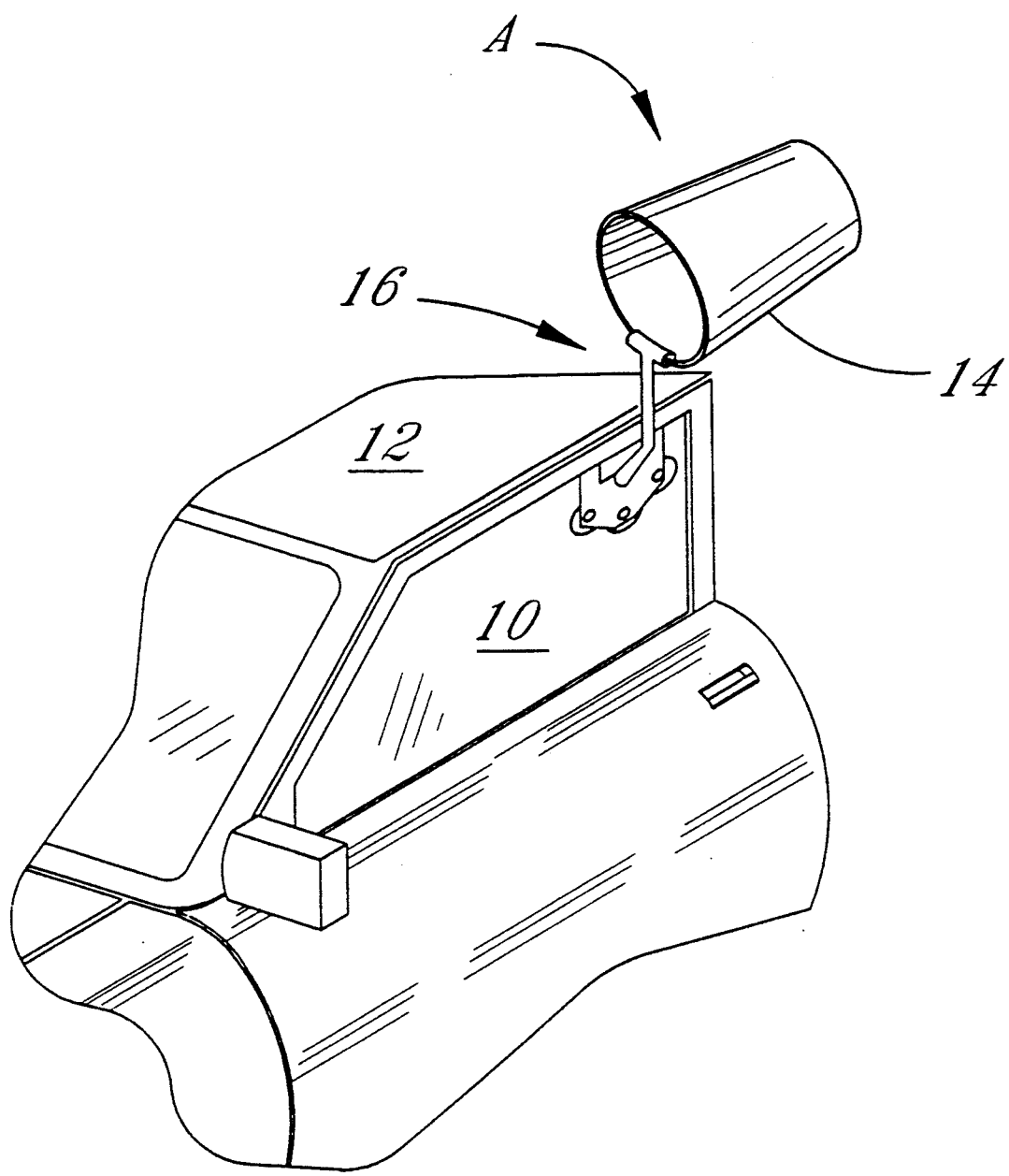
FIG. 1 is a sectional perspective view of the display device of the invention attached to a vehicle.

Referring to FIG. 1 of the drawings, a display device according to the invention is shown attached to window 10 of a vehicle 12.

Display device A consists of a wind sock 14 attached to mounting assembly 16. The mounting assembly includes an upper mounting unit 18 and a lower mounting unit 20, each connected with an end of mounting rod 22. Mounting assembly 16 is preferably formed of molded plastic, however, other suitable materials could be used such as metal.

Wind sock 14, as best seen in FIGS. 2 and 4 is made from any suitable fabric such as one which is woven, knitted, or extruded. It is preferred that the fabric is woven of nylon yarns. Again, yarns of other materials such as cotton or natural and synthetic blends may be used. Preferably, some type of indicia is provided along opposite sides of the wind sock such as logos or printed matter.

Wind sock 14 is made to be approximately twelve inches long to be tapered from front to rear. The forward opening 25 is made to be seven inches in diameter while the rearward opening 26 has a five inch diameter. These sizes may vary as desired, however, the difference between the openings 25 and 26 should be between one inch and three inches. Adjacent opening 25, a tubular attaching or receiving pocket 28 is formed. Receiving pocket 28 is open at its lower portion 30 to allow for entry of a circular mounting ring 34 to be described later.

The preferred shape for wind sock 14 is tubular and tapered front to rear as shown in the drawings. It is understood that wind sock 14 could consist of a hollow interior surrounded with three or more sides so as to be shaped in a triangular, square, or rectangular, etc. configuration. The mounting ring 34 would be configured to conform with the configuration of at least the forward portion of the wind sock. Accordingly, it is understood that the term mounting ring as herein used is intended to refer to a member defining the circuit of the forward end portion of the wind sock.

The mounting assembly 16 as shown in FIGS. 2, 3, and 4 includes an upper mounting unit 18 which is arranged at the upper end of mounting rod 22. Upper mounting unit 18 consists of a tubular receiving member 24 secured to the end of rod 22. Tubular support member 24 is arranged to extend transverse to the intended direction of movement of the supporting vehicle 12 and is also arranged to have its longitudinal axis extending substantially perpendicularly of the longitudinal axis of support rod 22. Tubular support 24 is provided with an interior surface 32 which is configured in the shape of a dog bone. Other configurations are possible just so long as sufficient surface area is provided to positively lock with the exterior surface 36 of mounting ring 34.

Mounting ring 34 consists of one-half inch to three-quarters inch diameter ring having a diameter equal to the diameter of forward end 25 of wind sock 14. Mounting ring 34 is broken or separated along its length to provide opposed ends 36. The outer surface of mounting ring 34 is configured to also be of dog bone shape. The circumference and shape of the outer surface of mounting ring 34 is such as to snugly and fittingly engage in the interior of tubular support member 24. The interaction between the dog bone configurations of the inner surface of tubular support member 24 and outer surface of mounting ring 34 fixes the mounting ring, support rod 22, and lower mounting unit 20 along substantially a single plane as a rigid member capable of maintaining the forward end 25 of air sock 14 in a vertical position. This mating engagement between surface 32 and the outer configuration of ring 34 prevents rotation of the ring relative to tubular support member 24.

While the preferred structure of mounting ring 34 has been described, it is possible that only its opposed ends 36 have the dog bone shaped configuration. Also, other shapes are possible such as hexagon or triangular. The ring may be solid or hollow.

Lower mounting unit 20 consists of a vertically extending plate 38 provided with notches 40 about its lower edge portions. Suction cups 42 are carried by notches 40. There are preferably three suction cups, although more or less may be provided as desired. The upper portion of plate 38 is slightly offset at 46 in the direction of suction cups 42. A ledge 48 is formed at the upper end of plate 38 and arranged to extend transversely thereof.

Mounting rod 22 is secured with plate 38 at its lower end. Mounting rod 22 extends outwardly away from the plate 38 a short distance of between one and two inches where it bends at substantially a right angle and extends in a substantially perpendicular direction upwardly away from plate 38.

In practice, display device A is secured with a partially lowered window 10 by placing ledge 48 over the upper edge of the window and securing suction cups 42 with the side of the window. Window 10 is then raised to engage the upper end of plate 38 to include ledge 48 within the window seal 52 seated in frame portion 50 of the automobile. With the window closed, display A is retained in position at interstate speeds. When the window is lowered, due to ledge 48 and suction cups 42, display A is maintained in position at low speeds and when the vehicle is not in motion.

To mount air sock 14 with mounting assembly 16, mounting ring 34 is passed through receiving pocket 28 so that opposed ends 36 appear at opening 30. Opposed ends 36 are then inserted into tubular support member 24 with forward portion 25 of wind sock 14 extending vertically and substantially along the same plane as the axis of mounting rod 22.

While a preferred embodiment of the invention has been described using specific terms, such description is for illustrative purposes only, and it is to be understood that changes and variations may be made without departing from the spirit or scope of the following claims.

What is claimed is:

1. A display device adapted for use with a vehicle, said display device comprising:
   a wind sock having attachment means at one end thereof for attaching said wind sock;
   a mounting assembly including an upper mounting unit for mounting with said attachment means of said wind sock, a lower mounting unit for mounting with said vehicle and a support rod interconnecting said upper mounting unit and said lower mounting unit;
   said upper mounting unit including a tubular support member having a shaped inner surface connected with and arranged transversely of one end of said support rod;
   said upper mounting unit further including a mounting ring comprising a broken circular member with opposed ends having a shaped circumference, said shaped circumference being configured to matingly fit within said shaped inner surface of said support member with said shaped circumference and said shaped inner surface interacting to lock said mounting ring against rotation in a fixed position relative said mounting assembly; whereby,
   said display device is provided with a rigid mounting assembly capable of maintaining its configuration while withstanding pressures created by interstate speeds.

2. The device of claim 1 wherein the circumference of said mounting ring is shaped along the entire length of said mounting ring.

3. The device of claim 1 wherein the circumference of not more than that area adjacent the opposed ends of said mounting ring is dog-bone shaped.

4. The device of claim 1 wherein a display is affixed to the exterior of said wind sock.

5. The device of claim 1 wherein said wind sock is tubular and tapered from front to rear.

6. The device of claim 1 wherein said lower mounting unit includes a mounting plate having an upper and a lower portion, said upper portion having a transverse ledge which extends over an upper edge of a vehicle window when said lower mounting unit is mounted with said vehicle;
   wherein said transverse ledge is adapted to engage with said upper edge and window seal when said vehicle window is raised to lock said lower mounting unit and said display device in position.

7. The device of claim 6 wherein said lower mounting unit includes suction cups which assist to secure said lower mounting unit with said vehicle window.

8. The device of claim 1 wherein said lower mounting unit includes a mounting plate arranged to extend substantially vertically when said lower mounting unit is secured with said vehicle, said mounting plate connecting with a lower end of said support rod so that said lower end extends transversely away from said mounting plate, said support rod bending upwardly adjacent said lower end to extend substantially vertically away from said lower mounting unit.

9. The device of claim 8 wherein said mounting plate carries three suction cups.

10. A display device adapted to be mounted with a vehicle, said display device comprising:
    an elongate tubular wind sock having a forward and rearward opening, a forward portion adjacent said forward opening having a mounting ring receiving pocket formed therein, said wind sock having design indicia thereon;
    a mounting assembly including a support rod, a lower mounting unit adapted to secure with a vehicle window, and an upper mounting unit for carrying said wind sock with said forward opening held above said vehicle along a substantially vertical axis;
    said lower mounting unit having a mounting plate secured with a lower end of said support rod, said mounting plate including suction means which secure with a vertical portion of a window of said vehicle and a transverse ledge engaging over an upper edge of said window and adapted to engage with a window seal of said vehicle to be locked in position, said lower mounting unit retaining said display device in position with said vehicle traveling at a high rate of speed;
    said support rod connecting with said lower mounting unit to extend outwardly and upwardly from said mounting plate to space said rod from vehicle overhang and to locate said upper mounting unit above said vehicle;
    said upper mounting unit includes a support member secured to an upper end of said support rod, said support member being arranged to extend substantially transversely of the longitudinal axis of said support rod;
    an annular broken mounting ring having opposed ends adapted to secure within said transverse support member in a non-yielding fashion to form a circular and substantially rigid upper mounting unit, said mounting ring being received within said receiving pocket of said wind sock; whereby,
    a display device having a substantially rigid mounting assembly capable of carrying said wind sock on a vehicle traveling at high speed is provided.

11. The device of claim 10 wherein said transverse support member comprises a tubular member having a shaped interior surface and said opposed ends of said mounting ring have a shaped exterior surface adapted to be matingly received within said shaped interior surface of said tubular member, said shaped surfaces acting to lock said tubular support member with said broken mounting ring in non-rotating fashion.

12. The device of claim 11 wherein said exterior surface of said opposed ends of said mounting ring and said inner surface of said tubular support member have dog bone configurations which innerfit to lock said mounting ring against rotation.

13. The device of claim 9 wherein said mounting assembly is formed of plastic.

14. The device of claim 9 wherein said mounting ring is circular.

* * * * *